US011155338B2

(12) United States Patent
Costello et al.

(10) Patent No.: US 11,155,338 B2
(45) Date of Patent: Oct. 26, 2021

(54) ENCRYPTION AND SECURITY IN A DISTRIBUTED CONTROL NETWORK

(71) Applicants: Rolls-Royce Corporation, Indianapolis, IN (US); Rolls-Royce North American Technologies Inc., Indianapolis, IN (US)

(72) Inventors: John Joseph Costello, Indianapolis, IN (US); Richard Joseph Skertic, Carmel, IN (US)

(73) Assignees: ROLLS-ROYCE NORTH AMERICAN TECHNOLOGIES INC., Indianapolis, IN (US); ROLLS-ROYCE CORPORATION, Indianapolis, IN (US)

( * ) Notice: Subject to any disclaimer, the term of this patent is extended or adjusted under 35 U.S.C. 154(b) by 0 days.

(21) Appl. No.: 16/440,465

(22) Filed: Jun. 13, 2019

(65) Prior Publication Data

US 2020/0361594 A1 Nov. 19, 2020

Related U.S. Application Data

(60) Provisional application No. 62/748,009, filed on Oct. 19, 2018.

(51) Int. Cl.
*B64C 13/16* (2006.01)
*G05B 15/02* (2006.01)
*H04L 29/06* (2006.01)

(52) U.S. Cl.
CPC .............. *B64C 13/16* (2013.01); *G05B 15/02* (2013.01); *H04L 63/0428* (2013.01)

(58) Field of Classification Search
CPC . G05B 15/02; H04L 63/0428; H04L 63/0478; H04L 63/0464; B64C 13/16
See application file for complete search history.

(56) References Cited

U.S. PATENT DOCUMENTS

| | | | |
|---|---|---|---|
| 4,217,754 A * | 8/1980 | Schmidt-Roedenbeck | ................. F02C 9/28 60/39.281 |
| 6,885,917 B2 | 4/2005 | Osder et al. | |
| 9,794,059 B2 | 10/2017 | Nguyen et al. | |
| 10,113,487 B2 * | 10/2018 | Cai | ........................ F02C 9/54 |
| 10,760,444 B2 * | 9/2020 | Terwilliger | ............. F01D 11/24 |
| 2004/0139727 A1 * | 7/2004 | Horswill | ................... F02C 9/46 60/233 |

(Continued)

OTHER PUBLICATIONS

CHEON et al. "Toward a Secure Drone System: Flying With Real-Time Homomorphic Authenticated Encryption", 2018, 24325-24339 (Year: 2018).*

(Continued)

*Primary Examiner* — Bickey Dhakal
(74) *Attorney, Agent, or Firm* — Crowell & Moring LLP

(57) ABSTRACT

Methods and systems are provided for controlling a component of an aircraft engine by communicating data over an inner control loop portion of a distributed engine control network for an aircraft; and controlling an operation of the aircraft engine by communicating encrypted data over an outer control loop portion of the distributed engine control network, wherein the data communicated over the inner control loop portion is unencrypted or encrypted with weaker encryption than the data communicated over the outer control loop portion.

19 Claims, 2 Drawing Sheets

(56) References Cited

U.S. PATENT DOCUMENTS

2017/0234230 A1* 8/2017 Schwarz .................. F02C 7/268
60/778

OTHER PUBLICATIONS

Extended European Search Report, issued in EP Application 19198373.3, dated Feb. 4, 2020, pp. 1-5, European Patent Office, Munich, Germany.
Jung Hee Cheon et al., "Toward a Secure Drone System: Flying with Real-Time Homomorphic Authenticated Encryption," Special Section on Security Analytics and Intelligence for Cyber Physical Systems, vol. 6, dated Mar. 26, 2018, pp. 24325-24339, published online by IEEE at URL https://doi.org/10.1109/ACCESS.2018.2819189.
Alireza R. Behbahani et al., "Intelligent Nodal-Based Controls Technologies for Integrated Propulsion Energy / Power / Thermal Management Systems," AIAA Propulsion and Energy Forum, dated Jul. 25-27, 2016, pp. 1-19, American Institute of Aeronautics and Astronautics, $52^{nd}$ AIAA/SAE/ASEE Joint Propulsion Conference, Salt Lake City, UT.
Hai-Jin Ding et al.,"Networked Control Systems Secured by Quantum Key Distribution," dated May 23, 2018, pp. 1-11, published by the Beijing National Research Center for Information Science and Technology, Beijing, China.
Jeffrey Hieb et al., "Security Enhancements for Distributed Control Systems," IFIP International Federation for Information Processing, vol. 253, Critical Infrastructure Protection, Chapter 10, pp. 133-146, published by Springer, Boston, MA.
Keith Stouffer et al., "Guide to Industrial Control Systems (ICS) Security," NIST Special Publication 800-82, Revision 2 Initial Public Draft, dated May 14, 2014, pp. 1-257, National Institute of Standards and Technology, Gaithersburg, MD.
Jacob Davis, "Understanding the Roles of Dataloggers, RTUs, PLCs and PACs," dated Feb. 28, 2018, pp. 1-4, published online by Campbell Scientific at URL https://www.campbellsci.com/blog/understanding-dataloggers-rtus-plcs-pacs.

* cited by examiner

ENCRYPTION AND SECURITY IN A DISTRIBUTED CONTROL NETWORK

This application is a non-provisional application of, and claims priority under 35 USC § 119(e) to U.S. provisional application 62/748,009, filed Oct. 19, 2018, the entire contents of which are hereby incorporated by reference.

TECHNICAL FIELD

This disclosure relates to aerospace and, in particular, to encryption in aerospace control systems.

BACKGROUND

Present aerospace control systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
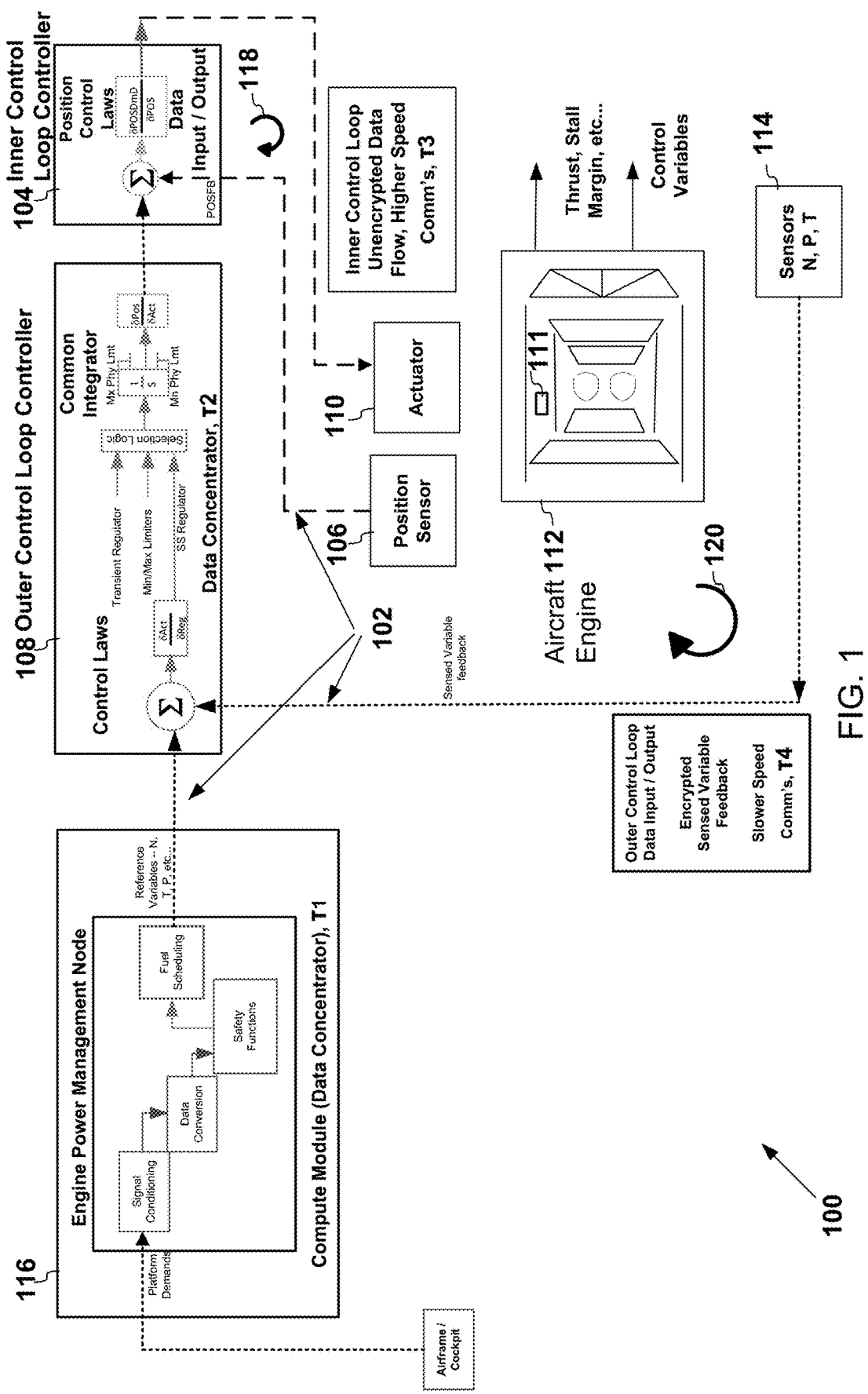
FIG. 1 is a schematic diagram of an example of a novel, distributed control system for an aircraft.

In one example, a method is provided controlling an aircraft engine. A component of the aircraft engine is controlled by communicating data over an inner control loop portion of a distributed engine control network for an aircraft; and an operation of the aircraft engine is controlled by communicating encrypted data over an outer control loop portion of the distributed engine control network, where the data communicated over the inner control loop portion is unencrypted or encrypted with weaker encryption than the encrypted data communicated over the outer control loop portion.

In another example, a distributed control system for an aircraft engine is provided. The distributed control system includes a distributed engine control network, an actuator, an inner control loop sensor, an outer control loop controller, and an outer control loop sensor. The actuator is configured to adjust a position of a component of the aircraft engine, such as a fuel pump valve, an angle of a compressor stator, or any other aircraft engine component. The inner control loop controller is configured to control the position of the component via data communicated over the distributed engine control network in an inner control loop, the inner control loop comprising sensor data received from the inner control loop sensor and actuator data transmitted to the actuator. The outer control loop sensor is configured to detect a control variable of the aircraft engine. The outer control loop controller is configured to control the position of the component of the aircraft engine via encrypted data communicated over the distributed engine control network in an outer control loop, the outer control loop comprising a value of the control variable received from the outer control loop sensor and position data transmitted to the inner control loop controller from the outer control loop controller. The data communicated in the inner control loop is unencrypted or encrypted with weaker encryption than the encrypted data in the outer control loop.

One feature of the systems and methods described below may be that encryption functionality is incorporated in slower, outer control loop, but not (or at least weaker encryption) in a faster, inner control loop. Alternatively or in addition, a feature of the systems and methods described below may be that the outer control loop may include less data because of the inner control loop. Alternatively or in addition, a feature of the systems and methods described below may be that encryption speed may be faster because of the smaller amount of data sent in the outer control loop. Alternatively or in addition, a feature of the systems and methods described below may be that the cost of the control system may be lower than a system in which the same encryption is employed in the inner and outer control loops. Alternatively or in addition, a feature of the systems and methods described below may be that the control system may weigh less than a corresponding federated system. Alternatively or in addition, a feature of the systems and methods described below may be that the system lowers the cost of certification based on partitioned and distributed topology. Alternatively or in addition, a feature of the systems and methods described below may be that reduced junction and ambient temperatures of the system may facilitate integration of COTS (commercial off-the-shelf) and/or MIL (military grade) electronics into nodes for higher performance processor capabilities, faster clock speeds for encryption, more memory, and/or other resulting benefits.

Figure 2:
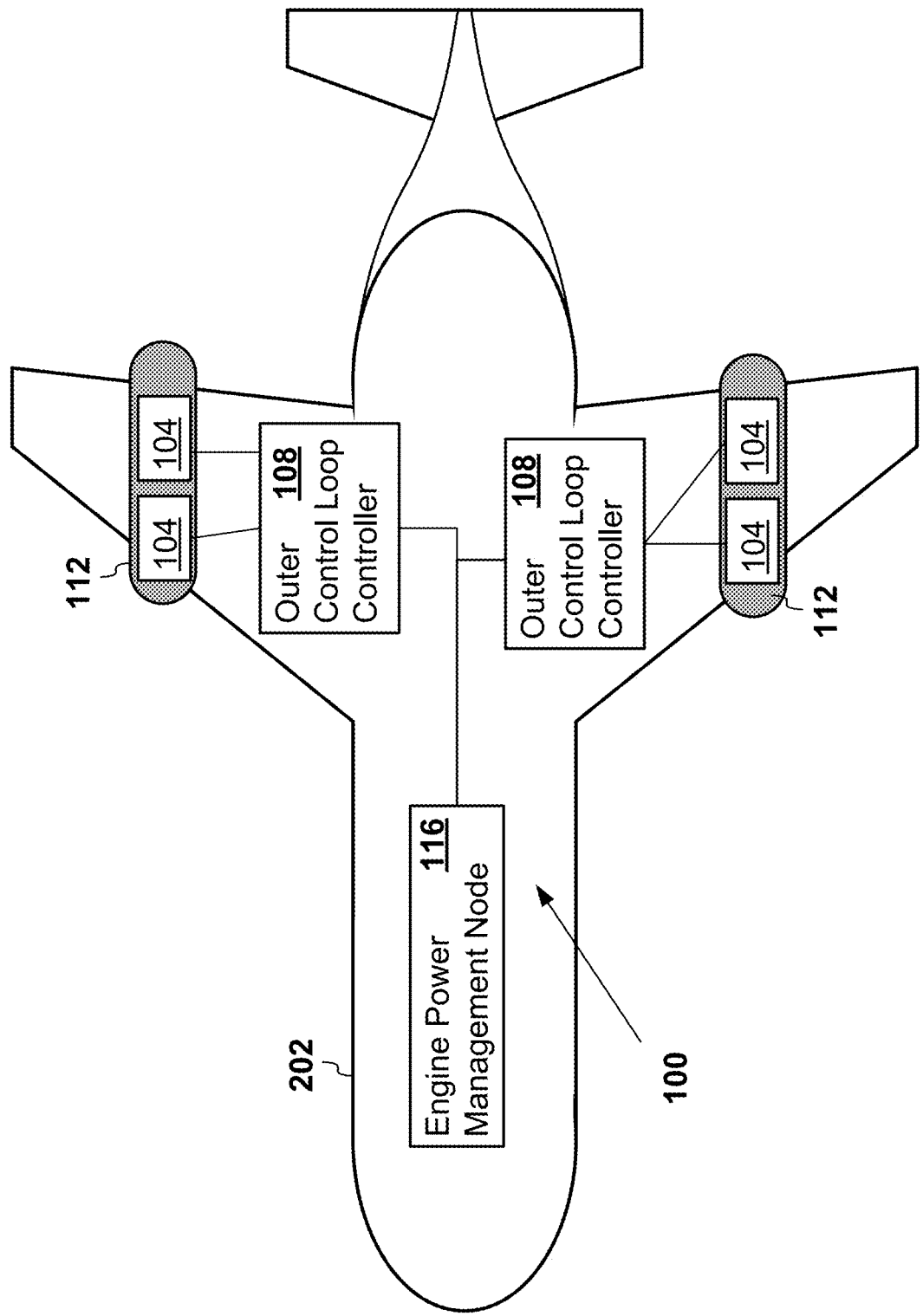
FIG. 2 illustrates a schematic diagram of a distributed control system installed in an aircraft.

FIG. 1 is a schematic diagram of an example of a control system 100 for an aircraft (see FIG. 2 for a schematic diagram of the control system 100 installed in an aircraft). The system 100 may include a distributed engine control network 102 for the aircraft, an inner control loop controller 104, an actuator 110 configured to adjust a position of a component 111 of an aircraft engine 112, an inner control loop sensor 106, an outer control loop controller 108, an outer control loop sensor 114, and an engine power management node 116. In the example illustrated in FIG. 1, the inner control loop controller 104 includes a position controller, the inner control loop sensor 106 includes one or more position sensors, the outer control loop controller 108 includes a data concentrator, and the outer control loop sensor 114 includes one or more engine control variable sensors, such as speed sensors, pressure sensors, and temperature sensors.

The inner control loop sensor 106, the actuator 110, and the outer control loop sensor 114 are shown outside of the aircraft engine 112 in FIG. 1, but one or more of these devices may be included in the aircraft engine 112. One or more of the outer control loop controller 108, the inner control loop controller 108, and the engine power management node 116, which are shown outside of the aircraft engine 112, may be included in the aircraft engine 112 in other examples.

The inner control loop controller 104 may be configured to control the position of the component of the aircraft engine 112 via unencrypted data communicated over the distributed engine control network 102 in an inner control loop 118. The inner control loop 118 comprising sensor data received from the inner control loop sensor 106 and actuator data transmitted to the actuator 110. For example, the actuator 110 may adjust the position of a valve in a fuel system of the aircraft engine 112, and the inner control loop sensor 106 may be configured to detect the position of the valve.

The outer control loop controller 108 may be configured to control the position of the component of the aircraft engine 112 via encrypted data communicated over the distributed engine control network 102 in an outer control loop 120. The outer control loop 120 may include control variable values received from the outer control loop sensor 114 and position data transmitted to the inner control loop controller 104.

During operation of the control system 100, the inner control loop controller 104 controls the position of the component of the aircraft engine 112 via the inner control loop 118. For example, the inner control loop controller 104 may transmit actuator data to the actuator 110 over the distributed engine control network 102 as unencrypted data. The actuator data may be an analog signal, a digital signal, one or more data packets, and/or any other form of signal. In response the actuator 110 may adjust the position of the component of the aircraft engine 112. As feedback, the inner control loop controller 104 may receive the sensor data from the inner control loop sensor 106 over the distributed engine control network 102 as unencrypted data. The sensor data may be an analog signal, a digital signal, one or more data packets, and/or any other form of signal that indicates the position of the component of the aircraft engine 112. The inner control loop controller 104 may repeatedly receive the sensor data and transmit the actuator data accordingly. As a result, the inner control loop controller 104 may position the component of the aircraft engine 112 to a target position.

The outer control loop controller 108 may receive one or more reference variables or target variables, such as speed, temperature, and pressure, from the engine power management node 116 over the distributed engine control network 102. The reference variables may indicate target values that corresponding control variables should have. Alternatively or in addition, the reference variables may indicate target values that corresponding control variables should have over a period of time. For example, the reference variables may indicate the corresponding control values are to steadily increase or decrease over a predetermined time period. The control variables represent properties of the aircraft engine 112 that are detected by the outer control loop sensors 114, and which may be useful in controlling the aircraft engine 112. Examples of the control variables may include compressor inlet pressure, compressor outlet pressure, turbine inlet temperature, turbine outlet temperature, engine speed, and/or any other property of the aircraft engine 112. The reference variables may be encrypted when communicated over the distributed engine control network 102 to the outer control loop controller 108.

In addition, the outer control loop controller 108 receives one or more control variable values from the outer control loop sensor 114. The control variable values represent properties of the aircraft engine 112 detected by the outer control loop sensors 114. The control variable values are encrypted when communicated over the distributed engine control network 102 from the outer control loop sensor 114 to the outer control loop controller 108.

The outer control loop controller 108 compares the control variable values with the reference or target variables. Based on this comparison, the outer control loop controller 108 may determine position data, such as the target position to which the actuator 110 should position the component of the aircraft engine 112. For example, the outer control loop controller 108 may determine that a fuel valve should be opened to a target size or to allow a target flow rate in order to achieve a target engine speed in view of the current engine speed detected by the outer control loop sensor 114. The outer control loop controller 108 may transmit the target position to the inner control loop controller 104 over the distributed engine control network 102 in encrypted form. The inner control loop controller 104 may then position the component of the aircraft engine 112 as described above.

The outer control loop controller 108 may repeat the process by receiving the one or more control variable values, determining the target position in case the target position has changed in view of the one or more control variable values, and transmitting the target position to the inner control loop controller 104. Accordingly, the outer control loop 120 includes the one or more control variable values received from the outer control loop sensor 114 and the position data transmitted to the inner control loop controller 104.

Only one set of the inner control loop controller 108, the inner control loop sensor 106 and the actuator 110 is shown in FIG. 1. However, the system 100 may include multiple such sets, each set controlling a different component of the aircraft engine 112 than the other sets. By encrypting data in the outer control loop 120 and not encrypting data in the inner control loop(s) 118, the control system 100 may achieve one or more of the advantages describe further above.

For example, in the system 100, the inner control loop(s) 118 may operate at much faster communication speeds than if the data in the inner control loop(s) 118 were encrypted. As a result, the system 100 facilitates real-time or model-based control systems. On the other hand, data in the outer control loop 120 is encrypted in order to support security protocols that may be established between the engine power management node and communications to the airframe. With such an arrangement, the system 100 may be a cyber-secure system or provide a cyber-secure engine controller, yet still meet performance targets with equipment that may not be as fast as desired. The distributed control system 100 may optimize the encryption functionality by locating the encryption in the outer control loop 120, which operates much more slowly than the inner control loop(s) 118. The different nodes within the system 100 be operated at different relative time constants for optimum control and encryption. For example, the time constant, T1, associated with the engine power management node 116 is larger (slower) than those, T2, associated with the outer control loop controller 108 and the inner control loop controller(s) 104, which operate much more rapidly than the engine power management node 116. Similarly, the time between transmissions, T3, on the inner control loop 118 may be less (faster) than the time constants, T2, associated with the outer control loop controller 108 and the inner control loop controller 104. Conversely, the time between transmissions, T4, on the outer control loop 120 may be longer than the time constants, T2, associated with the outer control loop controller 108 and the inner control loop controller 104 and even the time constant, T1, associated with the engine power management node 116. In one example, the time constants may have the following relative magnitudes: $0.4 s \geq \tau 4 \geq \tau 1 \geq \tau 2 \geq \tau 3 \geq 500$ to $1,000 \mu s$. In other examples, the specific and relative magnitudes may be different.

The data in the inner control loop 118 may be unencrypted as described herein. Alternatively, the data in the inner control loop 118 may be encrypted with weaker encryption than the data in the outer control loop 118. In the context of this disclosure, encrypting a first set of data "with weaker encryption" than a second set of data means that less computing power is required to encrypt the first set of data than to encrypt the second set of data provided that the amount of data in the first set is the same as the amount of data in the second set. In some examples, encrypting the first set of data "with weaker encryption" than a second set of data may additionally mean a weaker encryption algorithm is used for the first set than for the second set. For example, Advanced Encryption Standard (AES) may be used to encrypt the second set, and a simple shift cipher may be used to encrypt the second set.

The engine power management node 116 may determine the reference variables using any now known or later discovered algorithm for determining reference variables from demands such as a thrust level angle received from a cockpit of the aircraft. The engine power management module 116 may perform tasks such as signal conditioning, data conversation, safety functions, and fuel scheduling.

The selection of the node on the distributed engine control network 102 in which to implement a safety critical system within the control system 100 may depend on the speed of response needed for the safety critical system. Some safety critical systems need relatively fast feedback in order to respond quickly enough to ensure that the safety critical system can be effectively implemented. For example, an overspeed protection system may monitor the speed of an engine shaft relatively frequently in order to avoid an overspeed failure. An overspeed failure may occur when the engine is allowed or forced to turn at a speed beyond design limits. The overspeed failure have any of a variety of causes, such as a shaft failure or a fuel system malfunction. Accordingly, the implementation of the overspeed protection system may be included in the inner control loop controller 104, for example, which may be able to detect an increasing speed of the engine faster than the outer control loop controller 108.

Table 1 lists examples of safety critical systems and the corresponding relative response speeds needed by the safety critical systems.

TABLE 1

| Safety Critical Systems | Speed of Response | Comments |
| --- | --- | --- |
| Thrust Reverser Control | Slower Response | |
| Thrust Reverser Angle | Slower Response | |
| Speed Data | Fast Response | Required for stable control, such as Overspeed Protection |
| Pressure Data | Fast Response | Required for surge margin detection |
| Temperature Data | Fast Response | |
| Anti-Ice Function | Slow Response | |
| Turbine Clearance Steady-State Control | Slow Response | |
| Turbine Clearance Transient Control | Fast Response | |
| Oil System Level | Slower Response | Trending data |
| Oil System Temperature | Slower Response | Trending data |
| Vibration System | Slower Response | Trending data |
| Ignition System | Slower Response | |
| Pneumatics System | Slower Response | |
| Fuel System | Faster Response | |
| Surge Margin | Faster Response | |
| Heat Management | Slower Response | |
| Fire & Overheat Detection | Slower Response | Trending data |
| Fire Extinguishing System | Slower Response | Trending data |

Four relative response speeds in increasing order of required response speed are identified in Table 1: Slow Response, Slower Response, Faster Response, and Fast Response. As an example of selecting a node in which to implement a system, safety critical systems requiring a Fast Response may implemented in the inner control loop controller 104; safety critical systems requiring a Faster Response may be implemented in the outer control loop controller 108; and safety critical systems requiring a Slow Response or a Slower Response may be implemented in engine power management node 116.

For example, the Surge Margin feature identified in Table 1 is a safety critical feature that helps to avoid encountering a compressor surge. A compressor operating map for a particular gas turbine engine may identify various operating regions of the compressor on a graph showing pressure ratio versus mass flow. The mass flow is an indication of the amount of mass of the fluid that is flowing through the compressor. The pressure ratio may be the ratio of the outlet pressure to the inlet pressure, where the outlet pressure is the pressure of the fluid at the outlet of the compressor, and the inlet pressure is the pressure of the fluid at the inlet of the compressor. The compressor operating map may include a surge line, which may have a positive slope in some examples. In such examples, the area above the surge line may be an operating region in which the pressure ratio is effectively too high, resulting in the compressor experiencing a compressor surge. In other words, the pressure becomes high enough at the outlet of the compressor that the fluid flow reverses, and flows back toward the inlet of the compressor, which is at a low enough pressure relative to the outlet pressure to induce the flow reversal.

Gas turbine engines are typically operated with a surge margin in order to prevent an inadvertent occurrence of a compressor surge. In other words, the compressor is operated far enough below the surge line that typical fluctuations in the pressure ratio do not result in crossing the surge line. The Surge Margin feature may monitor the pressure at the inlet of the compressor, the pressure at the outlet of the compressor, and the flow rate and, based on the compressor operating map, cause adjustments to keep the compressor operating in a region outside of the surge margin. The adjustments may include, for example, reducing the amount of fuel being injected into the combustor and/or releasing pressure from one or more compressor stages. Because Table 1 indicates a Faster Response is needed for the Surge Margin feature, the outer control loop controller 108 may include an implementation of the surge margin feature.

Each of the outer control loop controller 108 and the inner control loop controller 104 may be any device that is configured control a continuously operating dynamical system. Each of the controllers 108 and 104 may implement any control algorithm now known or later discovered in control theory. Examples of the controller 108 and 104 may include a proportional-integral-derivative (PID) controller, a linear controller, a non-linear controller, a single-input single-output (SISO) controller, a multiple-input multiple-output (MIMO) controller, a digital controller, and an analog controller. In contrast, a traditional proportional-integral (PI) controller has been the preferred type of controller for aerospace engine control. In some examples, the inner control loop controller 104 may generate the actuator data based on position control laws, and the outer control loop controller 108 may generate the position data based on control laws.

The distributed engine control network 102 may be any collection of transmission links over which data between computing nodes may be exchanged. The network 102 may include Ethernet, serial link(s), a local area network (LAN), a wired network, a wireless network, a wireless local area network (WLAN), a WI-FI® network (WI-FI is a registered trademark of Wireless Ethernet Compatibility Alliance, Inc. of Austin, Tex.), a personal area network (PAN), a wide area network (WAN), an Internet Protocol (IP) network, a mesh network, a packet-based network, any other type of communications network, and/o any combination thereof. In some examples, the transmission links of the network 102 between the inner control loop controller 104 and the inner control loop sensor 106 and/or the actuator 110 may be a different type than the other transmission links of the network 102. In some examples, the transmission links of the network 102 may all be a common type, such as Ethernet. Alternatively or in addition, the distributed engine control network 102 may include redundant physical links for improved reliability.

Although arrows shown in FIG. 1 indicate a direction of data flow, data does not necessarily only flow in the direction indicated by the arrows. The data flow may be bi-directional in some examples.

One or more of the inner control loop sensor(s) 106 and the outer control loop sensor(s) 114 may include a communication circuit configured to send and/or receive data on the distributed engine control network 102. In some examples, the inner control loop sensor(s) 106 and the outer control loop sensor(s) 114 may include communication circuits and share a physical sensor. For example, the shared physical sensor may detect engine speed, and the communication circuit of the inner control loop sensor 106 may transmit the sensor data obtained from the shared physical sensor at a first frequency to the inner control loop controller 104 in an unencrypted format; whereas the communication circuit of outer control loop sensor 106 may encrypt and transmit the sensor data obtained from the shared physical sensor at a second frequency to the outer control loop controller 108 in an encrypted format, where the second frequency is less than the first frequency.

The aircraft engine 112 may be any type of engine, such as a gas turbine engine, a turbine engine, an electric engine, or a combustion engine. The aircraft engine 112 may supply power to and/or provide propulsion for the aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle.

If the aircraft engine 112 is a gas turbine engine, the gas turbine engine may take a variety of forms in various examples. For example, the gas turbine engine may be an axial flow engine. In some forms, the gas turbine engine may have multiple spools and/or may be a centrifugal or mixed centrifugal/axial flow engine. In some forms, the gas turbine engine may be a turboprop, a turbofan, or a turboshaft engine. Furthermore, the gas turbine engine may be an adaptive cycle and/or variable cycle engine. Other variations are also contemplated.

The gas turbine engine may include an intake section, a compressor section, a combustion section, a turbine section, and an exhaust section. During operation of the gas turbine engine, fluid received from the intake section, such as air, may be compressed within the compressor section. The compressed fluid may then be mixed with fuel and the mixture may be burned in the combustion section. The combustion section may include any suitable fuel injection and combustion mechanisms. The hot, high pressure fluid may then pass through the turbine section to extract energy from the fluid and cause a turbine shaft of a turbine in the turbine section to rotate, which in turn drives the compressor section. Discharge fluid may exit the exhaust section.

As noted above, the hot, high pressure fluid passes through the turbine section during operation of the gas turbine engine. As the fluid flows through the turbine section, the fluid passes between adjacent blades of the turbine causing the turbine to rotate. The rotating turbine may turn a shaft, for example. The blades may rotate around an axis of rotation, which may correspond to a centerline of the turbine in some examples.

FIG. 2 illustrates a schematic diagram of the control system 100 installed in an aircraft 202. The system 100 includes multiple outer control loop controllers 108, each of which is for a corresponding aircraft engine 112 and each of which is in communication with the engine power management node 116 over the distributed engine control network 102. Each of the outer control loop controllers 108 are in communication with a corresponding set of the inner control loop controllers 104.

In FIG. 2, the engine power management node 116 and the outer control loop controllers 108 are shown on an airframe of the aircraft 202. In other examples, the engine power management node 116 and/or one or more of the outer control loop controllers 108 may be included in the aircraft engine 112.

Each component of the system 100 may include additional, different, or fewer components than illustrated. Alternatively or in addition, the system 100 may be implemented with additional, different, or fewer components. The outer control loop controller 108, the inner control loop controller 104, and/or the engine power management node 116 may include a memory and a processor.

The system 100 may be implemented in many different ways. Each module, such the engine power management node 116, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of a memory, for example, that comprises instructions executable with the processor or other processor to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

Parts of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. However, the computer readable storage medium is not a transitory transmission medium for propagating signals.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

To clarify the use of and to hereby provide notice to the public, the phrases "at least one of <A>, <B>, ... and <N>" or "at least one of <A>, <B>, ... <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

What is claimed is:

1. A system comprising:
   a distributed engine control network for an aircraft, which is a wired network;
   an inner control loop controller;
   an actuator configured to adjust a position of a component of an aircraft engine;
   an inner control loop sensor, wherein the inner control loop controller is configured to control the position of the component via data communicated over the distributed engine control network in an inner control loop, the inner control loop comprising sensor data received from the inner control loop sensor and actuator data transmitted to the actuator;
   an outer control loop controller; and
   an outer control loop sensor configured to detect a control variable of the aircraft engine, wherein the outer control loop controller is configured to control the position of the component of the aircraft engine via encrypted data communicated over the distributed engine control network in an outer control loop, the outer control loop comprising a value of the control variable received from the outer control loop sensor and position data transmitted to the inner control loop controller from the outer control loop controller, wherein the data communicated in the inner control loop is unencrypted or encrypted with weaker encryption than the encrypted data in the outer control loop, wherein the distributed engine control network, the inner control loop, the outer control loop, the inner control loop controller, the outer control loop controller, the actuator, the inner control loop sensor, and the outer control loop sensor are included in the aircraft.

2. The system of claim 1, wherein the outer control loop controller is configured to determine a target position of the component of the aircraft engine from the control variable value and a corresponding reference variable, the target position included in the position data.

3. The system of claim 2, wherein the outer control loop controller is configured to receive the corresponding reference variable from an engine power management node.

4. The system of claim 1, wherein the inner control loop controller includes an implementation of a safety feature.

5. The system of claim 4, wherein the safety feature is selected from a group consisting of Speed Data, Pressure Data, Temperature Data, and Turbine Clearance Transient Control.

6. The system of claim 1, wherein the outer control loop controller includes an implementation of a surge margin feature configured to maintain operation of a compressor of a gas turbine engine outside of a surge margin.

7. The system of claim 1, wherein the inner control loop controller includes an implementation of an overspeed protection system configured to prevent an engine shaft of the aircraft engine from exceeding a predetermined rotational speed.

8. A method comprising:
   controlling a component of an aircraft engine by communicating data over an inner control loop of a distributed engine control network, the distributed engine control network being a wired network that is included in an aircraft; and
   controlling an operation of the aircraft engine by communicating encrypted data over an outer control loop of the distributed engine control network included in the aircraft, wherein the inner control loop connects an inner control loop controller, an actuator configured to adjust a position of the component of the aircraft engine, and an inner control loop sensor, wherein the outer control loop connects an outer control loop controller and an outer control loop sensor configured to detect a control variable of the aircraft engine, wherein the component is controlled by the inner control loop controller controlling the position of the component via data communicated over the distributed engine control network in the inner control loop, the inner control loop comprising sensor data received from the inner control loop sensor and actuator data transmitted to the actuator wherein controlling the operation of the aircraft engine includes controlling the position of the component of the aircraft engine by the outer control loop controller via encrypted data communicated over the distributed engine control network in the outer control loop, the outer control loop comprising a value of the control variable received from the outer control loop sensor and position data transmitted to the inner control loop controller from the outer control loop controller, wherein the data communicated in the inner control loop is unencrypted or encrypted with weaker encryption than the encrypted data in the outer control loop, wherein the distributed engine control network, the inner control loop, the outer control loop, the inner control loop controller, the outer control loop controller, the actuator, the inner control loop sensor, and the outer control loop sensor are included in the aircraft.

9. The method of claim 8 wherein controlling the component of the aircraft engine comprises implementing a safety feature.

10. The method of claim 8 wherein controlling the component of the aircraft engine comprises monitoring engine speed and controlling fuel flow in response to engine speed exceeding a threshold.

11. The method of claim 8, wherein the data communicated over the inner control loop is unencrypted.

12. The method of claim 8, wherein controlling the operation of the aircraft engine comprises monitoring a compressor inlet pressure, a compressor outlet pressure, and a mass flow through a compressor of the aircraft engine, and wherein the component of the aircraft engine includes a device configured to adjust pressure in the compressor.

13. The method of claim 8, wherein controlling the operation of the aircraft engine comprises controlling a fuel system of the aircraft engine.

14. A system comprising:
a distributed engine control network for an aircraft;
a position controller;
an actuator configured to adjust a position of a component of an aircraft engine;
a position sensor configured to detect an indication of the position of the component, wherein the position controller is configured to control the position of the component via unencrypted data communicated over the distributed engine control network in an inner control loop, the inner control loop comprising sensor data received from the position sensor and actuator data transmitted to the actuator;
a data concentrator; and
a control variable sensor configured to detect a control variable representing a physical state of the aircraft engine, wherein the data concentrator is configured to control the position of the component of the aircraft engine via encrypted data communicated over the distributed engine control network in an outer control loop, the outer control loop comprising a control variable value received from the control variable sensor and position data transmitted to the position controller, wherein the distributed engine control network, the data concentrator, the position controller, the inner control loop, and the outer control loop are included in the aircraft, wherein the distributed engine control network is a wired network.

15. The system of claim 14, wherein the component of an aircraft engine comprises a fuel flow valve, a pressure control device, a cooling device, and/or a turbine tip control device.

16. The system of claim 14, wherein the data concentrator is configured to determine a target position of the component of the aircraft engine from the control variable value and a corresponding reference variable, the target position included in the position data.

17. The system of claim 16, wherein the data concentrator is configured to receive the corresponding reference variable from an engine power management node.

18. The system of claim 14, wherein the position controller includes an implementation of a first safety feature, the data concentrator includes an implementation of a second safety feature, wherein the first safety feature requires a faster response than the second safety feature.

19. The system of claim 14, wherein the data concentrator is a cyber-secure controller.

* * * * *